July 9, 1968  R. W. YOUNG  3,391,691
BLOOD PRESSURE GAUGE
Filed May 16, 1967
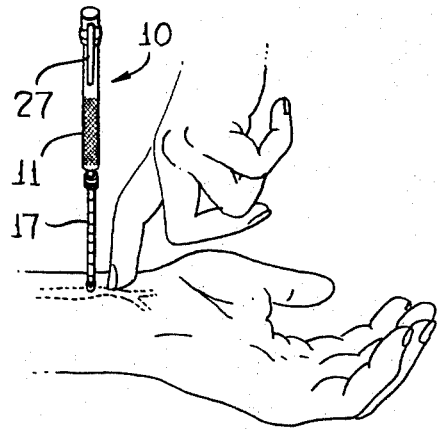
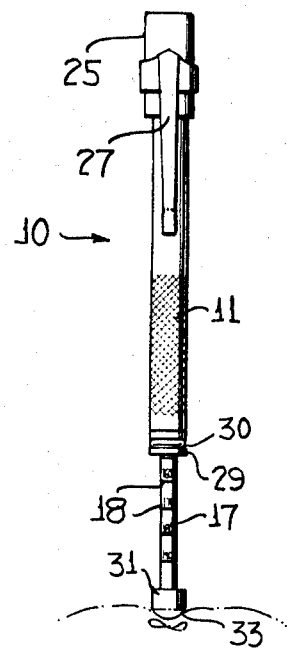
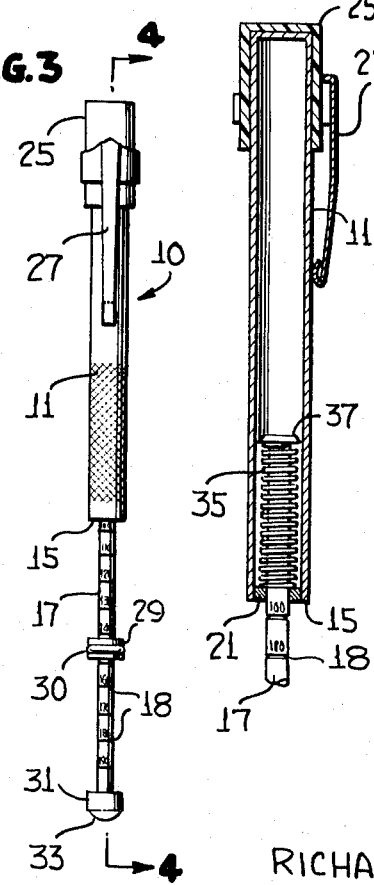
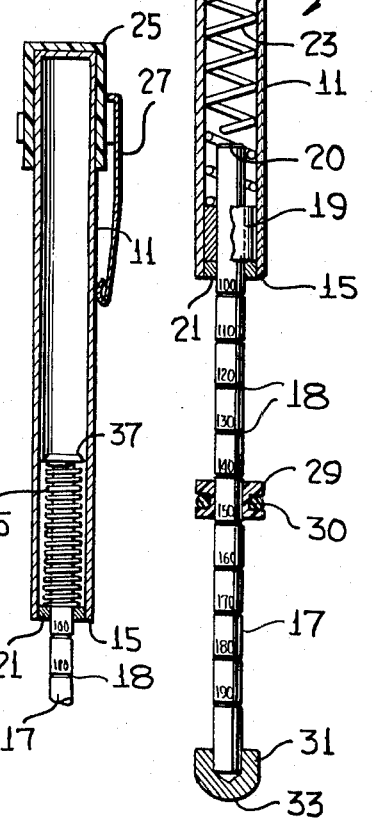
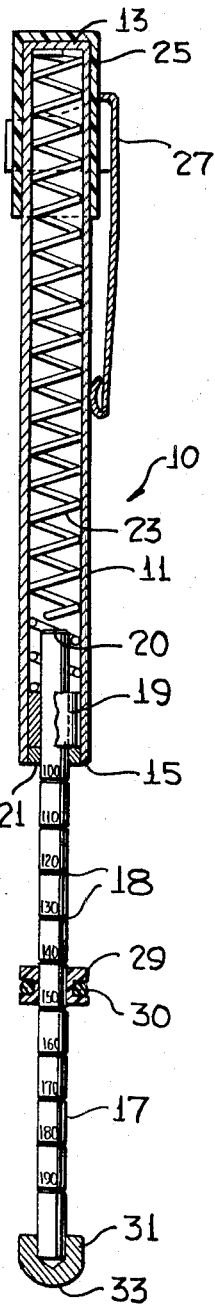
INVENTOR
RICHARD W. YOUNG.
BY *Hurvitz, Rose & Greene*
ATTORNEYS

United States Patent Office 3,391,691
Patented July 9, 1968

3,391,691
BLOOD PRESSURE GAUGE
Richard W. Young, 1135 Richland Ave.,
Baton Rouge, La. 70806
Filed May 16, 1967, Ser. No. 638,808
10 Claims. (Cl. 128—2.05)

ABSTRACT OF THE DISCLOSURE

A systolic pocket blood pressure gauge comprising a tube and rod which are telescopically associated such that the rod is movable within the tube, and a marker slidably positioned on the rod so as to be translated thereon by the end of the tube upon retraction of the rod within the tube, the tube and rod being spring-loaded such that the rod member is normally in a position of maximum extension relative to said tube. The marker is normally positioned adjacent the tube and is translated thereby along the rod by the tube during retraction of the rod into the tube, the marker retaining the position to which it was so translated upon return of the rod to a position of maximum extension.

Background of the invention

This invention relates generally to instruments for measuring blood pressure and particularly to a compact systolic blood pressure gauge which may be stored in a vest pocket and which retains the measured blood pressure reading after completion of the actual measurement.

Systolic blood pressure is the amount of pressure required to cut off the flow of blood through an artery. Prior art systolic blood pressure measuring instruments have employed a pair of telescopically related, spring-loaded tubes, the tubes being biased in an extended position. By exerting axial pressure on the tubes against an artery until blood flow in that artery is cut off, and by monitoring the relative displacement of the tubes from the fully extended position required to produce such flow cut off, the systolic pressure could be monitored. The means for monitoring the displacement of the tubes has often proved to be inconvenient or clumsy. For example, one prior art device employs a pointer extending from the inner tube through a longitudinal slot in the outer tube, the outer tube having calibrated markings adjacent the slot. The disadvantage with this arrangement lies in the fact that the tubes, and hence the pointer, return to their original bias position upon removal of instrument from the body, thereby requiring the operator to take a reading while exerting the requisite pressure. Such a technique is often inconvenient. Those prior art instruments which retain their readings after measurement require additional separable elements which extend from the instrument so as to be susceptible to damage.

Summary of the invention

The present invention overcomes the disadvantages of the prior art instruments by providing a telescopically related external tube and internal rod, the latter having a marker slidably positioned thereon. Prior to a measurement, the marker is placed adjacent the entrance to the tube with the rod fully extended.. Upon exertion of axial pressure on the tube, the tube displaces the marker along the rod, the latter having a calibrated scale marked along its length. Upon removal of the instrument, the marker remains stationary at the position on the rod to which it was moved by the tube. The gauge of this invention thus provides a "memory" feature for measured readings, and does so without requiring awkward structure extending from the gauge.

The primary object of this invention is to provide a gauge for measuring blood pressure which is simple in construction and easily employed to measure.

Another object of this invention is to provide a blood pressure measuring gauge which can be readily employed by inexperienced personnel.

Still another object of this invention is to provide a blood pressure measuring gauge which is simple in construction and which retains the measured blood pressure reading after completion of the measurement procedure.

These and other objects, which will be obvious to one skilled in the art upon reading these specifications, are accomplished by the exemplary embodiments herein.

Brief description of the drawings

FIGURE 1 is a perspective view of the device of this invention as utilized to measure blood pressure;

FIGURE 2 is a view in elevation showing the device of this invention in a partially contracted position;

FIGURE 3 is a view in elevation of the device of this invention in a fully extended position subsequent to a blood pressure measurement;

FIGURE 4 is an enlarged sectional view through the lines 4—4 of FIGURE 3, illustrating in detail the actuating mechanism of the device of this invention; and FIGURE 5 is an enlarged partial section illustrating a modification of the actuating mechanism illustrated in FIGURE 4.

Description of preferred embodiments

Referring specifically to FIGURES 1 through 4 of the accompanying drawings, there is illustrated a blood pressure gauge 10 in accordance with this invention, comprising a tube 11, which for the purposes of illustration is cylindrical in shape, having an end wall 13 and an open end 15. Open end 15 of tube 11 receives a rod 17 in telescopic relation. Rod 17, for purposes of illustration, is disclosed as being cylindrical in shape and having a plurality of calibrated markings 18 spaced along its length. Markings 18 may be circumferential notches about the rod 17; however, the manner in which the markings are made on rod 17 are not considered critical to this invention. The outside diameter of rod 17 is somewhat smaller than the inside diameter of tube 11. A guide member 19 of substantially cylindrical shape is secured about the rod member 17 adjacent its upper end 20, the latter being always disposed within tube 11. The outside diameter of guide member 19 permits the guide member to pass slidably along the inner wall of tube 11. A shoulder ring 21 is secured within tube 11 at the mouth of open end 15. Shoulder ring 21 has an outer diameter substantially equal to the inner diameter of tube 11, and an inner diameter which permits rod 17 to pass slidably therethrough. Shoulder ring 21 may optionally be integral with the tube 11 rather than a separate but attached structure. Shoulder ring 21, in addition to providing a guide for tube 17, also acts as a stop for guide member 19, to prevent end 20 of rod 17 from passing completely beyond end 15 of tube 11. That is, guide member 19 rests on shoulder 21 in the fully extended position of rod 17. A spring member 23 having one end secured to guide member 19 and having its other end secured to end wall 13 of tube 11 biases the rod member to its fully extended position. The spring member 23 may be secured to guide member 19 and end wall 13 of tube 11 by means of appropriate welds, adhesives, or the like. This of course depends in part on the material employed for tube 11 and rod 17, such material being either a suitable metal such as steel, or alternatively a plastic or similar material.

A cylindrical cap 25 is fitted over the closed end of tube 11. Cap 25 may be constructed of plastic, Teflon or the like. A conventional pocket clip 27 is secured about cap 25 and extends along the length of tube 11. Pocket clip 27 permits device 10 to be secured to a common shirt or vest pocket.

An annular marker ring 29 is slidably positioned on rod member 17. Marker ring 29 may be constructed of Teflon, plastic, or similar material, it being important that the frictional force exerted between the inner diameter of ring 29 and rod 17 is sufficient to maintain the marker ring 29 fixed relative to rod 17 in the absence of some externally applied force. The marker ring comprises a Teflon annulus having a circumferential notch formed in its outer surface, an O-ring 30 being disposed in said notch. The outer diameter of the marker ring is substantially equal to the outer diameter of tube 11, and the length of marker ring 29 along rod 17 is somewhat smaller than the distance between adjacent ones of calibrated markings 18. While neither of these dimensions for marker ring 29 is critical, it is to be understood that the marker ring must be of such radial size as to be engageable by open end 15 or shoulder 21 of tube 11 during retraction of rod 17 into tube 11.

The graduated markings or calibrated markings 18 along rod 17 are calibrated to read blood pressure levels either directly or with the aid of a conversion table. Such calibration involves relating the tension in spring 23 to the markings 18, techniques for doing this being well known.

Secured to the end of rod 17, which is remote from tube 11, is a cap member 31 which alternatively may be constructed integrally with tube 17. Cap member 31 is cylindrical in shape and, as illustrated in the drawings, has an outside diameter substantially equal to the diameter of tube 11. A rubber pad 33 is secured to the end of cap 31 remote from tube 11, pad 33 serving as the point of contact with the patient's body during a blood pressure measurement.

While the embodiment illustrated in FIGURE 4 employs a compression spring 23, the apparatus of this invention may similarly employ an extension spring such as spring 35 illustrated in the modified embodiment of FIGURE 5. For the latter embodiment, the upper portion of rod 17 terminates in a collar portion 37 to which one end of spring 35 is secured. The other end of spring 35 is secured directly to shoulder 21 at the open end 15 of tube 11. Collar portion 37 of rod 17 may be of such outside diameter to also serve as a guide to permit smooth passage of rod 17 within tube 11.

In operation, it is to be understood that device 10 provides a measurement of systolic blood pressure, that is, the pressure required to cut off the flow of blood through an artery. Prior to measurement the marker ring 29 is manually positioned immediately adjacent open end 15 of tube 11. The operator, as illustrated in FIGURE 1, then places his index finger against the body of the patient at a point at which blood pulsation may be monitored, such as the radial artery in the wrist. The instrument 10 is then placed with rubber pad 33 against the body on the same artery immediately upstream of the pulse monitoring point. Holding the instrument by tube 11, the operator exerts gradual pressure along the axis of rod 17, causing rod 17 to retract into tube 11 and causing end 15 of tube 11 to translate marker ring 29 relative to rod 17. While exerting the pressure on instrument 10, the operator continues to monitor blood pulsations with the index finger. The pressure of instrument 10 against the artery is increased until the blood pulsations cease entirely, at which time the instrument is removed from the body. The axial pressure along tube 11 during the measurement will have displaced marker ring 29 downwardly along rod 17 to some particular position at which it remains after removal of the instrument. This position of the marker ring relative to the calibrated markings 18 provides a measure of the systolic blood pressure.

It is to be understood that the particular cylindrical configurations of tube 11, rod 17 and marker ring 29 are illustrative only and that elements of rectangular or other suitable cross sections may readily be employed.

In an embodiment of this invention which has been constructed by applicant, the graduated markings have taken the form of circumferential notches about rod 18, and were calibrated so as to represent blood pressure in millimeters of mercury. Specifically, the top marker, as illustrated in FIGURE 4, represented 100 millimeters of mercury and each subsequently lower marking represented a reading 10 millimeters of mercury higher.

The "memory" feature provided by the marker ring provides an advantageous feature whereby the operator need not read the blood pressure indication while exerting the pressure on the instrument. In addition, the particular indicating device, namely the marker ring, need not extend beyond the outermost dimension of the remainder of the device so that damage of the marker and resulting inaccuracies are substantially minimized.

While I have described and illustrated various specific embodiments of my invention, it will be clear that variations of the details of construction which are specifically illustrated and described may be resorted to without departing from the true spirit and scope of the invention as defined in the appended claims.

I claim:

1. A device for measuring systolic blood pressure comprising:
    a hollow tube;
    a rod extending into said tube at an opening in one end thereof, said rod having a calibrated scale in the form of a plurality of markings spaced along its length;
    spring means disposed within said tube for normally biasing said rod in a position of maximum extension relative to said tube;
    and a marker member, slidably disposed along the length of said rod exteriorly of said tube, said marker member extending a sufficient radial distance from said rod such that it is blocked from entering said opening in said one end of said tube;
    wherein when said rod is fully extended from said tube and said marker member is manually placed adjacent said one end of said tube, a retraction of said rod into said tube causes said one end of said tube to displace said marker member to a given position along said rod, the marker member remaining at said given position upon return of said rod to its fully extended condition.

2. The combination according to claim 1 wherein said rod is cylindrical in shape and said marker member is an annulus surrounding said rod.

3. The combination according to claim 2 wherein said hollow tube is a cylinder having an annular shoulder forming said opening at said one end, said shoulder abutting said annulus upon retraction of said rod into said tube.

4. The combination according to claim 3 further comprising an annular cap disposed about a first end of said rod remote from said tube, serving as a stop at said first end of said rod for said marker member.

5. The combination according to claim 4 wherein the other end of said tube opposite said one end thereof is closed, said device further comprising an annular guide member secured to and disposed about said rod adjacent its opposite end and within said tube, said guide member normally abutting the inner surface of said shoulder when said rod is in its fully extending position, and wherein said spring means comprises a compression spring having one end secured to said guide member and another end secured to said other end of said tube.

6. The combination according to claim 5 further comprising a pocket clip secured to said tube at said other end thereof.

7. The combination according to claim 4 wherein the end of said rod which is internal of said tube terminates in a collar having a larger diameter than said rod, and wherein said spring means comprises an extension spring having one end secured to the inner surface of said shoulder and another end secured to said collar.

8. The combination according to claim 7 further comprising a pocket clip secured to said tube.

9. The combination according to claim 3 wherein said scale is calibrated in millimeters of mercury.

10. The combination according to claim 9 wherein said tube and said rod are metal and said marker member is Teflon.

References Cited
UNITED STATES PATENTS

| | | | |
|---|---|---|---|
| 1,670,685 | 5/1928 | Marks | 73—388 XR |
| 1,875,862 | 9/1932 | Fair | 73—388 XR |

DAVID SCHONBERG, *Primary Examiner.*

DONALD O. WOODIEL, *Examiner.*